United States Patent Office 3,256,278
Patented June 14, 1966

---

3,256,278
N-HYDROXY ETHYL-ORTHO ACETYL AND CARB-
ALKOXY AMINO PHENYL-GLYOXAMIDES AND
PROCESS FOR MAKING 2-ORTHOAMINO PHEN-
YL-MORPHOLINES
Francis J. Petracek, Canoga Park, Calif., assignor to
Rexall Drug and Chemical Company, Los Angeles,
Calif., a corporation of Delaware
No Drawing. Filed Apr. 1, 1963, Ser. No. 269,705
4 Claims. (Cl. 260—247.5)

This invention relates to compositions of matter classified in the art of chemistry as substituted morpholines as well as to a process of preparing the same and to intermediates obtained in the synthesis.

The invention sought to be patented, in its final product composition aspect, resides in the concept of a chemical compound of the formula:

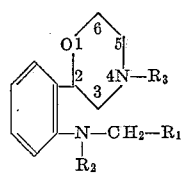

where $R_1$ is hydrogen or a straight or branched chain alkyl group of 1 to 5 carbon atoms and $R_2$ and $R_3$ are hydrogen or lower alkyl, and the pharmaceutically acceptable non-toxic acid addition and quaternary ammonium salts thereof.

The invention sought to be patented, in its intermediate composition aspect, resides in the concept of a chemical compound of the formula

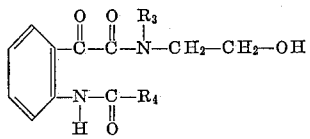

wherein $R_3$ is as described above and $R_4$ is a straight or branched chain alkyl group of 1 to 5 carbon atoms or lower alkoxy.

As used throughout the specification and in the claims, the terms "lower alkyl" and "lower alkoxy" embrace straight and branched chain alkyl and alkoxy groups, respectively, containing 1 to 6 carbon atoms.

The intermediates and the acid addition salts of the final products are white crystalline solids. These physical properties, taken with spectral and other analytical data as well as the structure of the starting materials and the mode of synthesis, positively confirm the structure of the compounds sought to be patented.

The final products possess the inherent applied use characteristics of having significant pharmacological activity as depressants of the central nervous system as determined by recognized and accepted pharmacological test procedures. The intermediates are useful in chemical synthetic procedures in making the final products as described hereinafter.

The manner and process of making and using the invention will now be generally described so as to enable a person skilled in the art of chemistry to make and use the same as follows:

Starting materials for the preparation of the compounds of this invention are derivatives of isatin having the formula

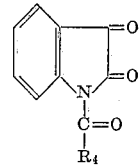

where $R_4$ is as described hereinabove. The starting materials of the above formula where $R_4$ is an alkyl group of 1 to 5 carbon atoms are prepared as described in J. Chem. Soc., 1957, 3470. Those starting materials having a lower alkoxy $R_4$ substituent are readily prepared by treating isatin with a compound of the formula

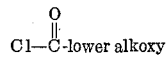

by conventional procedures.

The initial step in the reaction sequence involves treatment of the starting material with a hydroxyethyl amine of the formula

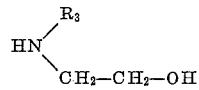

where $R_3$ is hydrogen or lower alkyl to form the tangible embodiments of the invention in its intermediate product composition aspect. The reaction is normally carried out in an inert solvent, such as acetonitrile, and the product is recovered by crystallization.

Treatment of the so-produced intermediates of the formula

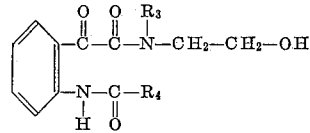

with an alkali metal aluminohydride, such as lithium aluminum hydride, under reflux in the presence of an inert solvent such as tetrahydrofuran, ether and the like, results in the preparation of final products of the formula

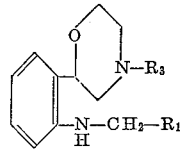

When $R_4$ of the intermediate is lower alkoxy, $R_1$ of the final product is hydrogen. When $R_4$ of the intermediate is alkyl of 1 to 5 carbon atoms, $R_1$ of the final product is the same as $R_4$. It is apparent that the final products of the above formula can be N-alkylated in accordance with conventional techniques of converting secondary to tertiary amines to convert the hydrogen substituent on the nitrogen atom to a lower alkyl group.

The tangible embodiments of this invention, in its final product composition aspect, may, if desired, be converted into their non-toxic pharmaceutically acceptable acid-addition or quaternary ammonium salts by conventional procedures. Typical acid-addition salts include the hydrochloride, hydrobromide, citrate, maleate, sulfate, nitrate and the like. Typical quaternary ammonium salts are those formed with such alkyl halides as methyl iodide, ethyl bromide, n-hexyl bromide and the like.

The tangible embodiments of this invention, either as the free base or in the form of a non-toxic pharmaceutically acceptable acid-addition or quaternary ammonium salts, may be combined with conventional pharmaceutical diluents and carriers, to form such dosage forms as tablets, capsules, solutions, suspensions, suppositories and the like.

The best mode contemplated by the inventor of carrying out this invention will now be set forth as follows:

*Example*

(a) *o-Acetamidophenylglyoxylic acid N-methyl-N-(2-hydroxyethyl) amide.*—100 grams of N-acetylisatin are stirred with 40 grams of N-methyl-N-(2-hydroxyethyl) amine in the presence of 500 ml. acetonitrile. After 2 hours, the mixture is cooled, diethyl ether added and the solids separated by filtration to yield 103 grams (74%) of the desired intermediate. Recrystallization from hot acetonitrile yields, upon cooling and addition of diethyl ether, an analytical sample, M.P. 122–123.5° C.

*Analysis.*—Calculated for $C_{13}H_{16}O_4N_2$: C, 59.08%; H, 6.10%; N, 10.60%. Found: C, 59.20%; H, 6.36%; N, 10.79%.

(b) *4 - methyl - 2-(o-ethylaminophenyl)-morpholine.*—o-Acetamidophenylglyoxylic acid N-methyl-N-(2-hydroxyethyl) amide (87 g., 0.33 mole) is dissolved with heating in 1000 ml. of tetrahydrofuran. The solution is added dropwise to a solution of lithium aluminum hydride (38 g., 1 mole) in anhydrous ether (500 ml.) and the mixture is refluxed overnight. The mixture is then cooled to 0° C. and isopropyl alcohol (300 ml.) added, followed by a slow addition of a saturated sodium chloride solution (244 ml.). The mixture is filtered, extracted three times with tetrahydrofuran and the extracts dried over anhydrous magnesium sulfate and concentrated to an oil. The oil is taken up in hydrochloric acid/water, extracted three times with chloroform and the water solution made basic to pH 10 to 11 with sodium hydroxide solution. The basic water solution is then extracted three times with chloroform, the extracts dried over anhydrous magnesium sulfate, concentrated and distilled and the oil converted to the crystalline mono-hydrochloride by conventional procedures. The salt is recrystallized from isopropyl alcohol to give the product, M.P. 203–204.5° C.

*Analysis.*—Calculated for $C_{13}H_{21}N_2OCl$: C, 60.80%; H, 8.24%; N, 10.91%; O, 6.23%. Found: C, 60.63%; H, 8.29%; N, 10.76%; O, 6.59%.

The subject matter which the applicant regards as his invention is particularly pointed out and distinctly claimed as follows:

1. A compound of the formula

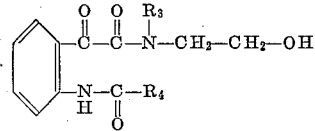

wherein $R_3$ is a member selected from the group consisting of hydrogen and lower alkyl and $R_4$ is a member selected from the group consisting of an alkyl group of 1 to 5 carbon atoms and lower alkoxy.

2. o-Acetamidophenylglyoxylic acid N-methyl-N-(2-hydroxylethyl) amide.

3. A method of preparing a compound of the formula

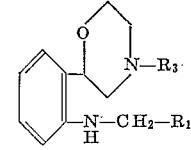

wherein $R_1$ is a member selected from the group consisting of hydrogen and an alkyl group of 1 to 5 carbon atoms and $R_3$ is a member selected from the group consisting of hydrogen and lower alkyl, which comprises refluxing a compound of the formula

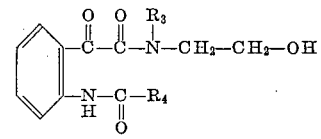

wherein $R_4$ is a member selected from the group consisting of an alkyl group of 1 to 5 carbon atoms and lower alkoxy with an alkali metal aluminohydride.

4. A method according to claim 3 wherein said alkali metal aluminohydride is lithium aluminum hydride.

References Cited by the Examiner

UNITED STATES PATENTS 2,832,777   4/1958   Kalm _____ 260—247.5

NICHOLAS S. RIZZO, *Primary Examiner.*

ROBERT L. PRICE, *Assistant Examiner.*